(12) United States Patent
Kasai et al.

(10) Patent No.: US 6,861,848 B2
(45) Date of Patent: Mar. 1, 2005

(54) CAPACITANCE POSITION SENSOR AND POSITION CONTROLLER EQUIPPED WITH THE SENSOR

(75) Inventors: Yuji Kasai, Tsukuba (JP); Hirokazu Nosato, Kashiwa (JP); Masahiro Murakawa, Tsukuba (JP); Taro Itatani, Tsukuba (JP); Tetsuya Higuchi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 87 days.

(21) Appl. No.: 10/279,846

(22) Filed: Oct. 25, 2002

(65) Prior Publication Data

US 2003/0080756 A1 May 1, 2003

(30) Foreign Application Priority Data

Oct. 26, 2001 (JP) .................................... 2001-329783
Jul. 15, 2002 (JP) .................................... 2002-206105

(51) Int. Cl.$^7$ ............................................. G01R 27/26
(52) U.S. Cl. ...................... 324/661; 324/658; 324/660; 324/662
(58) Field of Search ................................ 324/658, 660, 324/661, 662

(56) References Cited

U.S. PATENT DOCUMENTS

| 3,974,825 | A | * | 8/1976 | Normann ..................... 600/17 |
| 5,083,470 | A | * | 1/1992 | Davis et al. .............. 73/864.24 |
| 6,456,182 | B1 | * | 9/2002 | Katayama et al. .......... 336/181 |
| 6,469,523 | B2 | * | 10/2002 | Sporl et al. ................. 324/685 |

FOREIGN PATENT DOCUMENTS

| JP | 9-178407 | 7/1997 |
| JP | 11-201708 | 7/1999 |

* cited by examiner

Primary Examiner—N. Le
Assistant Examiner—John Teresinski
(74) Attorney, Agent, or Firm—Oblon, Spivak, McClelland, Maier & Neustadt, P.C.

(57) ABSTRACT

A capacitance position sensor includes a pair of opposed tabular electrodes, an LC oscillator circuit having a toroidal core winding and whose oscillating frequency varies with change in capacitance between the pair of electrodes, and an arithmetic processing unit for calculating an absolute value of a distance between the electrodes from the oscillating frequency of the oscillator circuit. A position controller includes a stationary member formed with one electrode of the pair of electrodes of the position sensor, a movable member on which the other electrode of the pair of electrodes is formed, and moving device for moving the movable member relative to the stationary member.

17 Claims, 12 Drawing Sheets

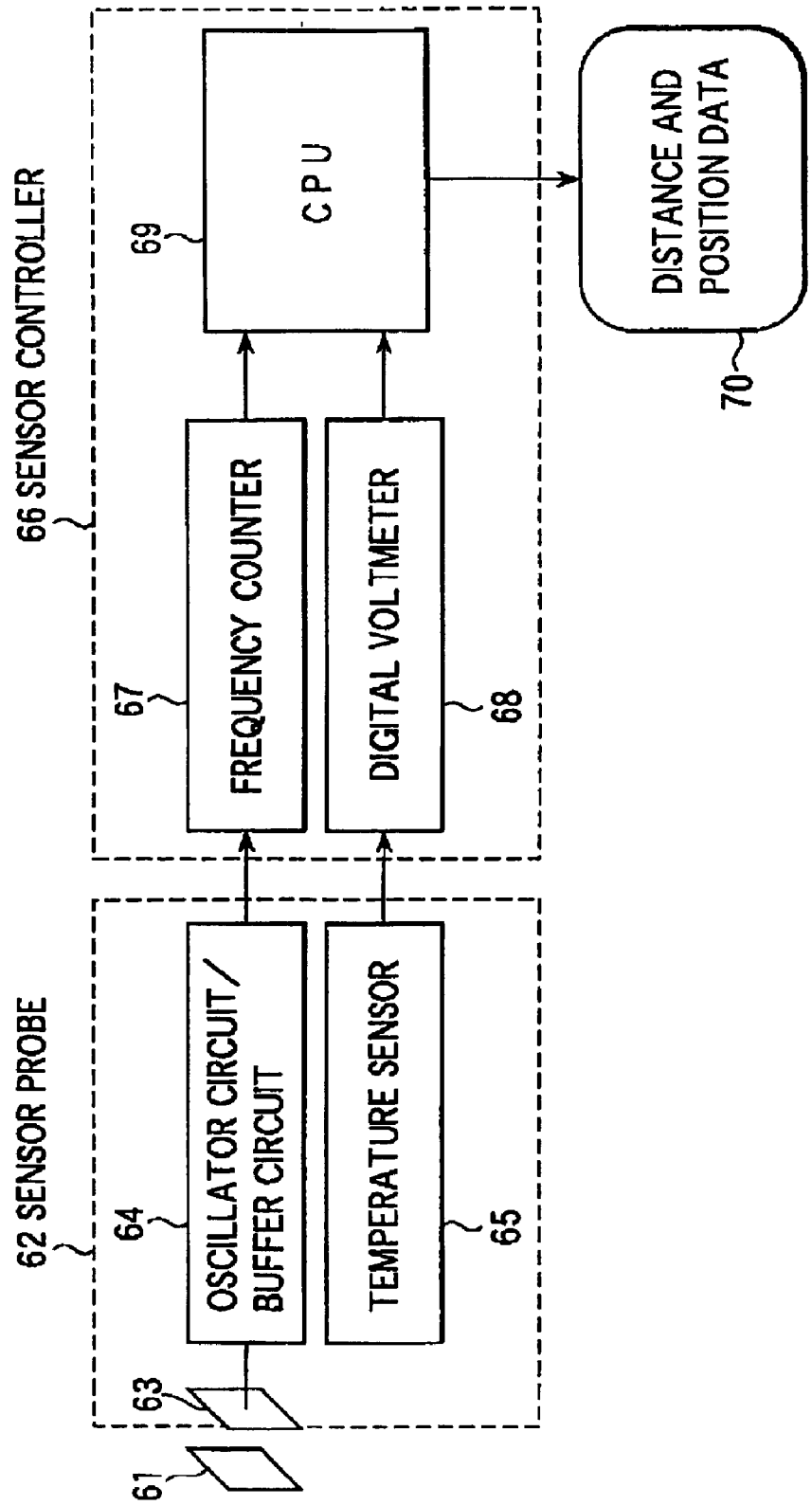

CAPACITANCE POSITION SENSOR AND POSITION CONTROLLER EQUIPPED WITH THE SENSOR

BACKGROUND OF THE INVENTION

1. Field of the Invention

The present invention relates to a capacitance position sensor for determining the distance between two opposed electrodes by measuring the capacitance between them, to a position controller equipped with the sensor, and particularly to a capacitance position sensor suitable for application to mirror control in a laser system or the like.

2. Description of the Prior Art

Lasing is achieved by amplifying a laser beam as it travels back and forth between multiple mirrors. The lasing state is maintained by precisely controlling the relative positions of the mirrors and the direction (orientation) of their faces. Conventional position sensors for this kind of mirror control include optical and resistive types. The optical type consists of numerous components (five to 10 mirrors and other optical components) and is therefore difficult to miniaturize and high in cost. The size of the world's smallest commercially available optical position sensor (produced by Omron Corporation of Japan) is 33×39×17 mm. Although sensors using slide resistors are inexpensive, they are inferior in positional regulation owing to the need for physical contact, backlash of the slide resistor and other drawbacks As at least several to more than ten mirrors are required for lasing, there is a pressing need for an inexpensive, accurate and compact position sensor. In fact, however, no position sensor that can be given high marks on all three of these points has yet emerged.

One commercially available capacitance position sensor is the capacitance bridge type position sensor marketed by ADE Corporation of the United States (see Canadian Patent No. 961,927). This also has the disadvantage of high price (around $1,700). Many conventional capacitance position sensors detect the capacitance by measuring the amplitude or phase of attenuated signal through the capacitance of the opposed electrodes, and have a problem of amplitude and phase fluctuation due to noise. Accuracy is therefore inferior owing to the considerable effect of noise.

Japanese Unexamined Patent Publication No. 11-201708 teaches another type of position sensor that utilizes in-plane inductance. However, it is clear from the graph of FIG. 20 in this publication that this position sensor does not achieve very high accuracy. On the other hand, Japanese Unexamined Patent Publication No. 9-17840 teaches a capacitance position (displacement) detector that detects position on a rail in the manner of the frame and slider of a vernier caliper. But it has low detection accuracy that is fundamentally impossible to improve beyond a certain limit owing to the structure requiring contact between the frame and the slider.

An object of the present invention is therefore to provide a position sensor that is compact, accurate, noise resistant and simple in structure. Another object of the present invention is to provide a position controller equipped with the position sensor. Still another object of the present invention is to provide a capacitance position sensor suitable for position control of the numerous mirrors used in lasing and the like and also suitable for multiaxial position control.

SUMMARY OF THE INVENTION

To attain this object, the present invention provides a capacitance position sensor comprising a pair of opposed tabular electrodes, an LC oscillator circuit having a toroidal core winding and whose oscillating frequency varies with change in capacitance between the pair of electrodes, and an arithmetic processing unit for calculating an absolute value of a distance between the electrodes from the oscillating frequency of the oscillator circuit.

The present invention includes the aforesaid configuration wherein the material of the toroidal core is carbonyl iron dust and the oscillator circuit is a Clapp oscillator circuit.

The present invention includes the aforesaid configuration wherein the oscillator circuit including the toroidal core is encapsulated in a molding together with a temperature sensor and the arithmetic processing unit uses an output of the temperature sensor to calculate a temperature corrected value of the frequency of the oscillator circuit output. The molding-encapsulated oscillator circuit can be shielded by covering it with a thin metal sheet.

The present invention includes the aforesaid configuration wherein one of the pair of opposed electrodes is formed on a surface of a base plate provided with a printed circuit board projecting from its rear surface, the oscillator circuit is formed on the printed circuit board, and a shielding metal film is provided on the rear side surface of the circuit board.

In another aspect, the present invention provides a position controller comprising: a stationary member formed with one electrode of the pair of electrodes of the aforesaid position sensor; a movable member on which the other electrode of the pair of electrodes is formed; and moving means for moving the movable member relative to the stationary member.

Since the capacitance position sensor of the present invention detects capacitance from the frequency of the oscillator circuit, it is resistant to noise and capable of conducting high-accuracy positional regulation notwithstanding its simple configuration and the fact that it is less than one-quarter as large and less than one-half as expensive as the conventional position sensor.

The position controller according to the invention utilizes the aforesaid position sensor and can therefore offer highly accurate, noise-resistant position control at low cost.

BRIEF DESCRIPTION OF THE DRAWINGS

FIG. 5 is a conceptual circuit diagram of the capacitance position sensor of the present invention.

DESCRIPTION OF THE PREFERRED EMBODIMENTS

Figure 1A:
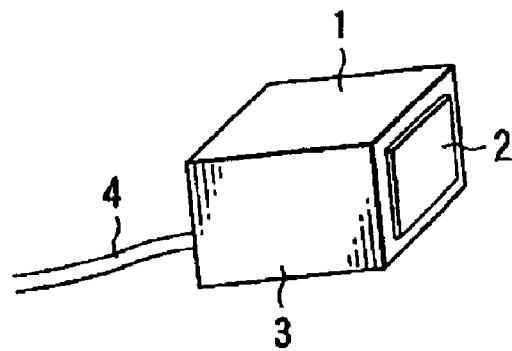
FIG. 1(a) is a perspective view of a capacitance position sensor that is an embodiment of the present invention.
Figure 1B:
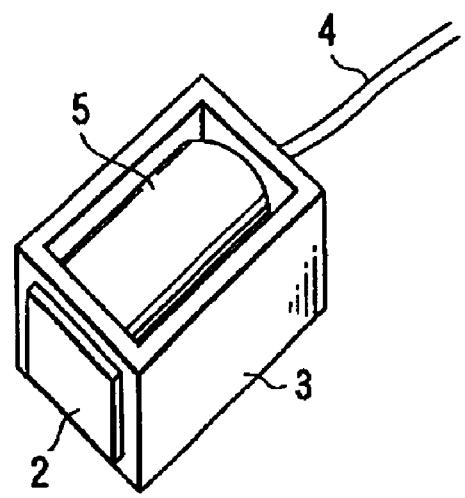
FIG. 1(b) is a perspective view of the capacitance position sensor of FIG. 1(a) with the bottom cover removed from the bottom surface of the case.
Figure 1C:
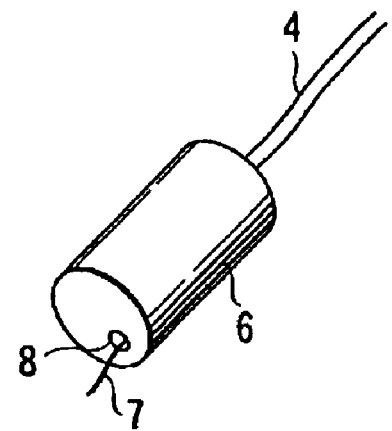
FIG. 1(c) is a perspective view of a molding encapsulating the circuitry of the position sensor of FIG. 1(a) to be accommodated in the case.

FIGS. 1(a) and 1(b) show a capacitance position sensor 1 that is an embodiment of the present invention. It has a case 3 and a tabular electrode 2 provided at the front surface of the case 3. A signal cable 4 connects with the capacitance position sensor 1. A molding 6 (shown in FIG. 1(c)) that encapsulates an internal circuit and is shielded by a metallic foil 5 covering its outer surface is disposed inside the case 3 as shown in FIG. 1(b).

The circuit encapsulated by the molding 6 is electrically connected to the tabular electrode 2 by a lead line 7 passing to the exterior through a hole 8. The capacitance position sensor 1 is installed so that the tabular electrode 2 opposes a tabular electrode (not shown) attached to the object to be measured to establish capacitance between the two electrodes. This capacitance and the circuit inside the molding 6 constitute an oscillator circuit. The internal configuration of the molding 6 is substantially the same as that of the position sensor shown in FIGS. 2(a) and 2(b). The details of the circuit are shown schematically in FIG. 3.

Figure 2A:
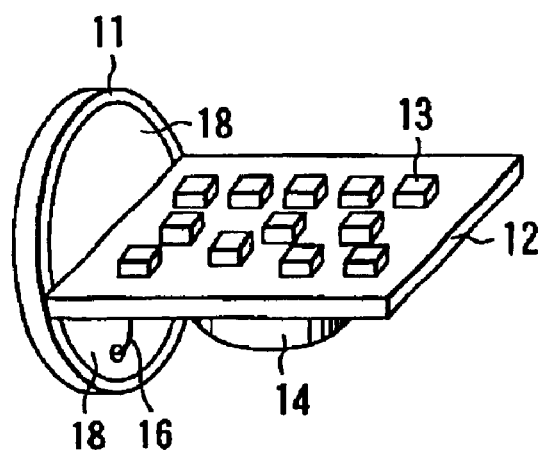
FIG. 2(a) is a perspective view showing a capacitance position sensor that is another embodiment of the present invention with its molding removed.
Figure 2B:
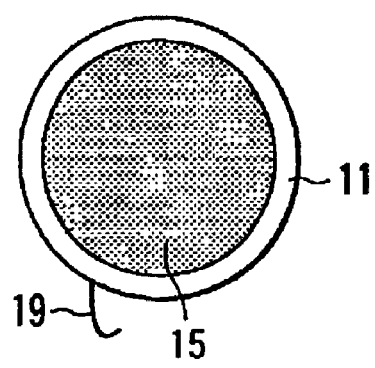
FIG. 2(b) is a front view of the capacitance position sensor of FIG. 2(a).
Figure 2C:
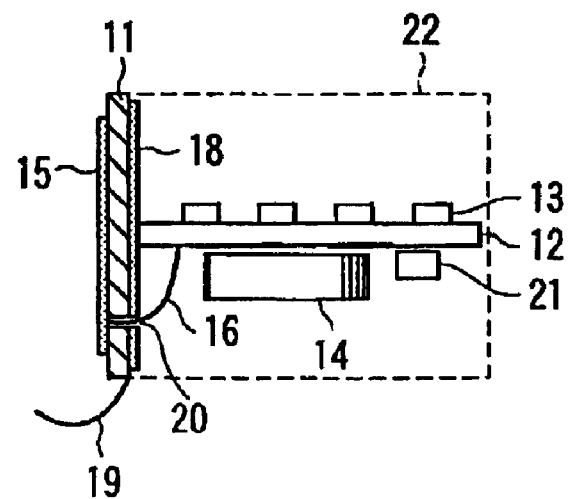
FIG. 2(c) is a side view of the capacitance position sensor of FIG. 2(a) with its molding removed.

FIGS. 2(a) and 2(b) show a capacitance position sensor 1 that is another embodiment of the present invention. The capacitance position sensor has a disk-like base plate 11 and an electrode 15 formed on the front surface of the base plate 11. The rear surface of the base plate 11 is overlaid with a metallic film 18 and supports a projecting circuit board 12.

The edge of the metallic film 18 is electrically connected to the circuit board 12 by soldering. The metallic film 18 is further grounded through a ground line 19 and serves as a shield for the circuit board 12.

Circuit elements 13 are mounted on one surface of the circuit board 12. The opposite surface is formed with capacitors for establishing capacitances other than that between the sensor electrodes and further with a coil 14 (a component of the oscillator circuit) and a temperature sensor 21. In order to minimize coil loss and inductance fluctuation due to temperature change, the coil 14 is preferably a toroidal core coil, i.e., a coil whose winding is formed on a doughnut-shaped core.

The core is preferably one made of carbonyl iron dust, because this also helps to lower loss and achieve a small temperature coefficient (small change in permeability with temperature). A specific example of such a core material is Mix No. 6 of Micrometals, Inc. of the United States. This carbonyl iron dust has a temperature coefficient of 35 ppm/° C. and a usable frequency band of 3–40 MHz. Use of mica capacitors is also preferable from the viewpoint of minimizing the temperature coefficient.

The circuit elements 13 on the circuit board 12 are electrically connected to the electrode 15 by a lead line 16 passing through a hole 20 in the base plate 11.

The foregoing circuit is encapsulated by a molding represented by the broken line 22. The molding establishes thermal contact so as to ensure that the temperature of the coil and other temperature-affected components of the oscillator circuit and the temperature detected by the temperature sensor are the same.

Typically, the diameter of the disk-like base plate 11 (which is the diameter of the sensor 1) is about 12 mm and the overall length of the sensor is about 12 mm.

Figure 3:
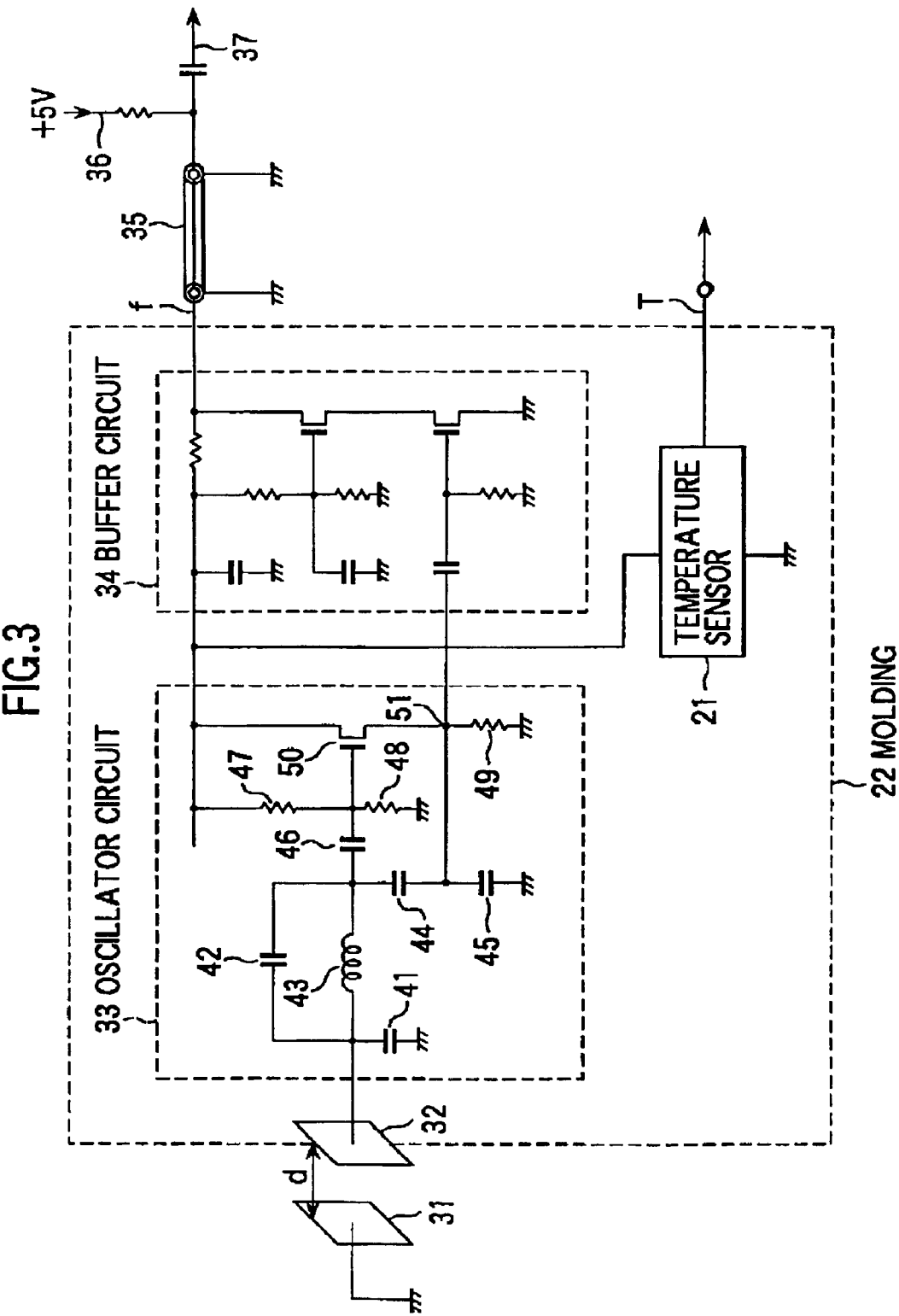
FIG. 3 shows an exemplary circuit of the capacitance position sensor of the present invention.

FIG. 3 shows an example of the circuit used in the present invention. In this drawing, reference numeral 31 designates an electrode mounted on the measured object; 32 a sensor electrode; 33 an oscillator circuit; 34 a buffer circuit; 35 a shielded signal line; 36 a power supply circuit; and 37 an output terminal. In the oscillator circuit, 41, 42, 44, 45 and 46 designate capacitors; 43 an inductance; 47, 48 and 49 resistors; 50 an FET (field-effect transistor); and 51 an output terminal of the oscillator circuit. The inductance 43 represents the inductance of the coil 14.

As can be seen in FIG. 3, when the measured object moves, the electrode 31 attached to it moves to change the distance d between the electrode 31 and electrode 32. The change in the inter-electrode capacitance C this produces changes the oscillating frequency of the oscillator circuit 33. The oscillator circuit 33 is a Clapp oscillator circuit, one type of high-stability LC oscillator circuit (Barkhausen-Kurz oscillator). Its frequency is in the neighborhood of 15 MHz.

Figure 4A:
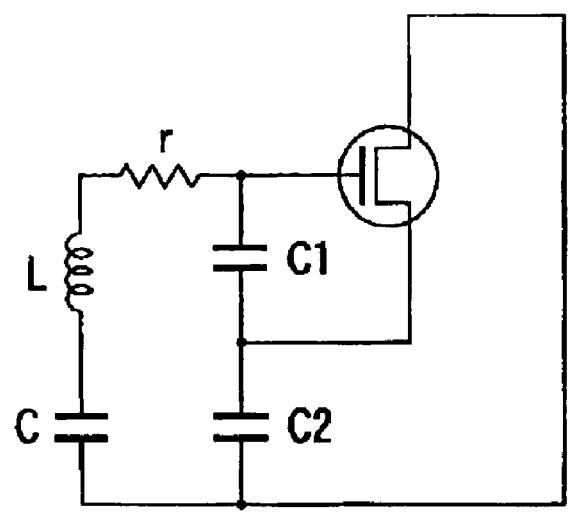
FIG. 4(a) shows a basic example of the oscillator circuit used in the capacitance position sensor of the present invention.
Figure 4B:
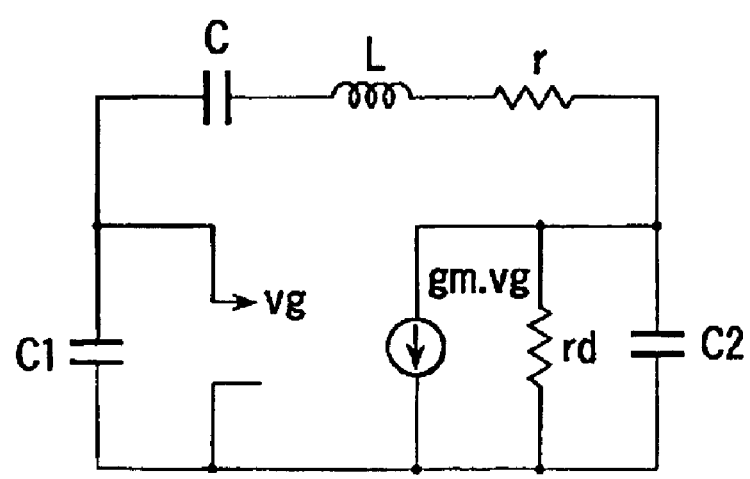
FIG. 4(b) shows an equivalent circuit for determining an oscillation conditional equation of the oscillator circuit.

FIG. 4(a) shows the basic configuration of the Clapp oscillator circuit. The reference symbols C, C1 and C2 in the drawing designate capacitor capacitances; L an inductance; and r the resistance component of the coil. The inductance L is the inductance of the coil 14 and the capacitances C, C1 and C2 correspond to the capacitance between the electrodes 31, 32 and the capacitances 44 and 45. FIG. 4(b) is an equivalent circuit for determining an oscillation conditional equation of the oscillator circuit.

The output of the oscillator circuit 33 is forwarded through the output terminal 51 to the buffer circuit 34. The buffer circuit 34 is provided to eliminate the effect of load. The output of the buffer circuit 34 is sent through the shielded signal line 35 to a frequency processing circuit (sensor controller).

The power supply circuit 36 supplies power (+5 V) to the sensor through the shielded signal line 35. The capacitance between the sensor electrodes 31, 32 determines the oscillating frequency of the oscillator circuit. The distance d between the electrodes 31, 32 can therefore be calculated from the frequency. In order to substantially eliminate the effect of temperature, the frequency is corrected for temperature using the output of the temperature sensor 21 encapsulated in the molding together with the oscillator circuit.

FIG. 5 is a conceptual diagram of the capacitance position sensor of the present invention. The reference numeral 61 designates an electrode provided on the measured object; 62 a sensor probe; 63 an electrode; 64 an oscillator circuit/buffer circuit; 65 a temperature sensor; 66 a sensor controller; 67 a frequency counter; 68 a digital voltmeter; 69 a CPU (microcomputer); and 70 output data (distance and position data). The sensor probe 62 shapes the waveform of the oscillator output into pulses and the frequency counter 67 measures the frequency of the oscillator output signal by counting the pulses and determining the number of pulses per a given period of time.

The oscillating frequency of the oscillator circuit/buffer circuit 64 is converted into a digital signal by the frequency counter 67 and the analog output value of the temperature sensor 65 is converted into a digital value by the digital voltmeter 68. Based on the outputs of the frequency counter 67 and the digital voltmeter 68, the CPU 69 calculates the temperature-corrected inter-electrode distance d using a calibration curve or formula stored in memory.

The Clapp oscillator circuit of FIG. 4(*a*) is used as the oscillator circuit of the sensor. If any loss should be present in the LC resonant circuit of the oscillator, the oscillating frequency will be affected by the parameters of the active element (the FET in the case of FIG. 4(*a*)). The parameters of the active element are liable to change with temperature and power supply voltage. Use of a Clapp oscillator is therefore preferable because the oscillating frequency of the Clapp oscillator is little affected by such changes.

Defining the capacitance between the detection electrodes C, the oscillating frequency f of the oscillator circuit of FIGS. 3 and 4 can be expressed by the approximation equation (1) and approximation equation (2) set out below. Further, defining the dielectric constant of the air between the detection electrodes as $\epsilon$, the electrode area as S and the inter-electrode distance as d, the inter-electrode capacitance C can be represented by the equation (3) set out below. It is assumed here that in FIG. 4 the drain output resistance rd of the FET, the transfer conductance gm and the gate input voltage Vg of the FET are very large relative to C1, C2 and C.

$$f = \frac{1}{2\pi}\sqrt{\frac{1}{LC}\left(1 + \frac{C}{C_1} + \frac{C}{C_2}\left(1 + \frac{r}{r_d}\right)\right)} \quad (1)$$

$$= \frac{1}{2\pi}\sqrt{\frac{1}{LC}} \quad (2)$$

$$C = \varepsilon \frac{S}{d} \quad (3)$$

The value actually detected when the inter-electrode capacitance is measured is the sum of the inter-electrode capacitance C and a certain capacitance (stray capacitance) $C_S$. Defining C of the approximation equation (2) as $C+C_S$, the equation (2) can be rewritten as the following equation (4). It then follows from Equations (3) and (4) that the distance d can be represented by equation (5). Then representing the constant terms by the coefficients A1, A2 and A3, equations (6) and (7) are obtained.

$$f = \frac{1}{2\pi}\sqrt{\frac{1}{L(C+C_s)}} \quad (4)$$

$$d = \frac{\varepsilon S}{\frac{1}{(2\pi f)^2 L} - C_s} \quad (5)$$

$$d = \frac{A_1}{\frac{A_2}{f^2} - A_3} \quad (6)$$

$$\frac{A_1}{d} = \frac{A_2}{f^2} - A_3 \quad (7)$$

where $$A_1 = \varepsilon S, \, A_2 = \frac{1}{(2\pi)^2 L'}, \, A_3 = C_s \quad (8)$$

Figure 6:
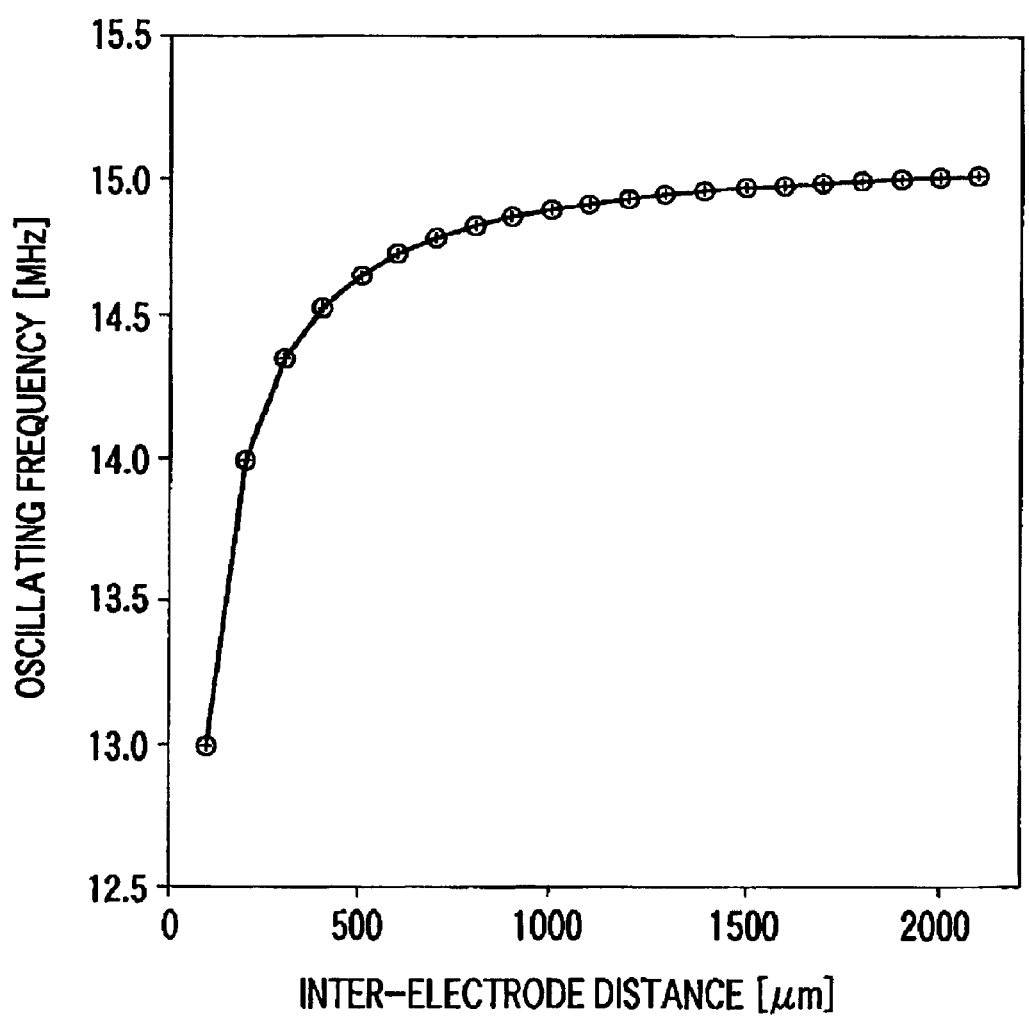
FIG. 6 is a graph showing one example of measurement results obtained by a capacitance position sensor of the present invention.

FIG. 6 is a graph showing one example of measurement results obtained using the capacitance position sensor of FIG. 1. The horizontal axis of the graph is scaled for inter-electrode distance and the vertical axis for oscillating frequency. The following is a specific example of the numerical values in this embodiment:

Where the area S of the electrodes 31, 32 is 1 cm² and the air dielectric constant $\epsilon$ is 8.85418×10⁻¹⁴/cm, the capacitance measured at d=0.05 cm (500 µm) is 1.770836 pF, and the capacitance measured at d=0.0501 cm (501 µm) is 1.767301 pF. The per-micrometer capacitance change $\Delta C$ at this inter-electrode distance d is therefore 3.53 fF (femto farad) or 0.00353 pF.

Figure 7:
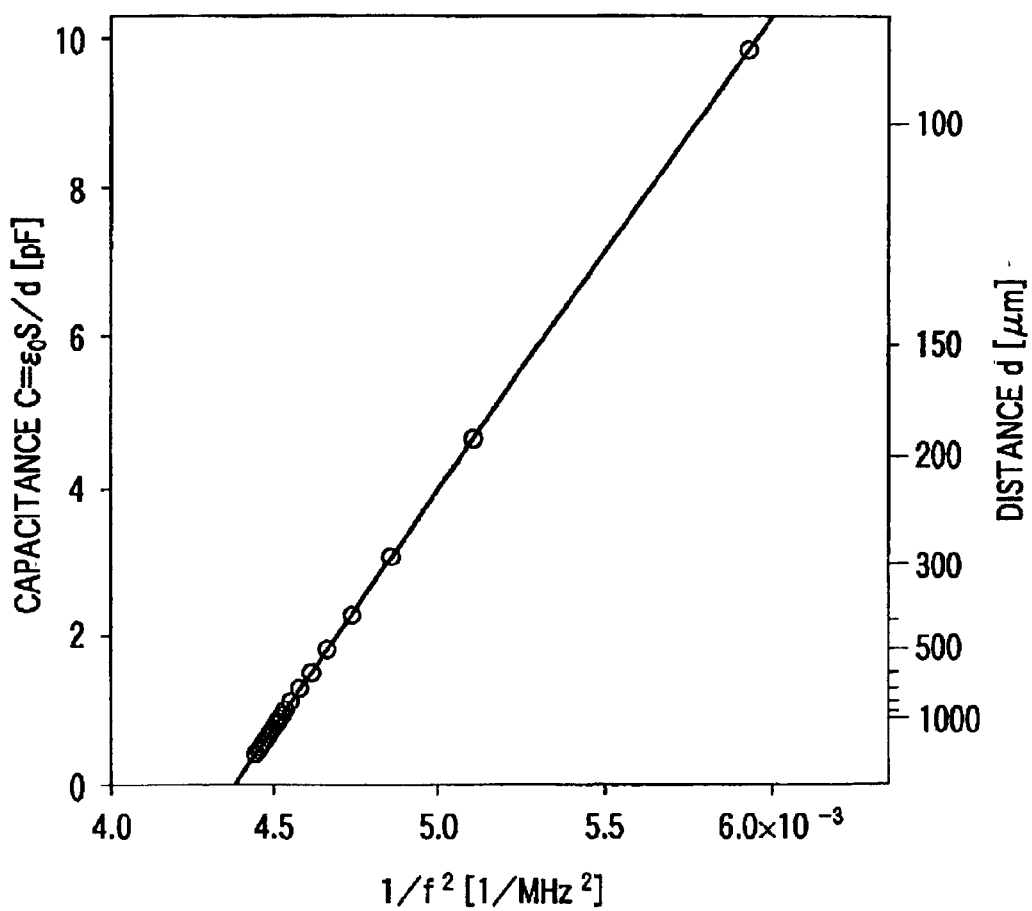
FIG. 7 is an example representation obtained by linearizing the example measurement results of FIG. 6.

FIG. 7 shows a characteristic curve obtained by first using the foregoing equations (4)–(7) to obtain a characteristic curve representing the oscillating frequency f as a function of the distance d between the electrodes 31, 32 and then converting the obtained curve to a linear scale. The horizontal axis in FIG. 7 represents the reciprocal of the square of the oscillating frequency and the vertical axis represents the inter-electrode capacitance and the inter-electrode distance. A2 is obtained from the slope and $C_S$ from the vertical axis intercept of the characteristic curve of FIG. 7.

The performance of the sensor of FIG. 1 was found to be as follows:

Position measurement accuracy:
0.2 µm or less (at inter-electrode distance of 500 µm), 50 nm or less (at inter-electrode distance of 100 µm)

Sensor probe size:
15×15×20 mm

Distance measurement range:
20 µm–5000 µm

Sensor power consumption:
50 mW or less

Figure 8:
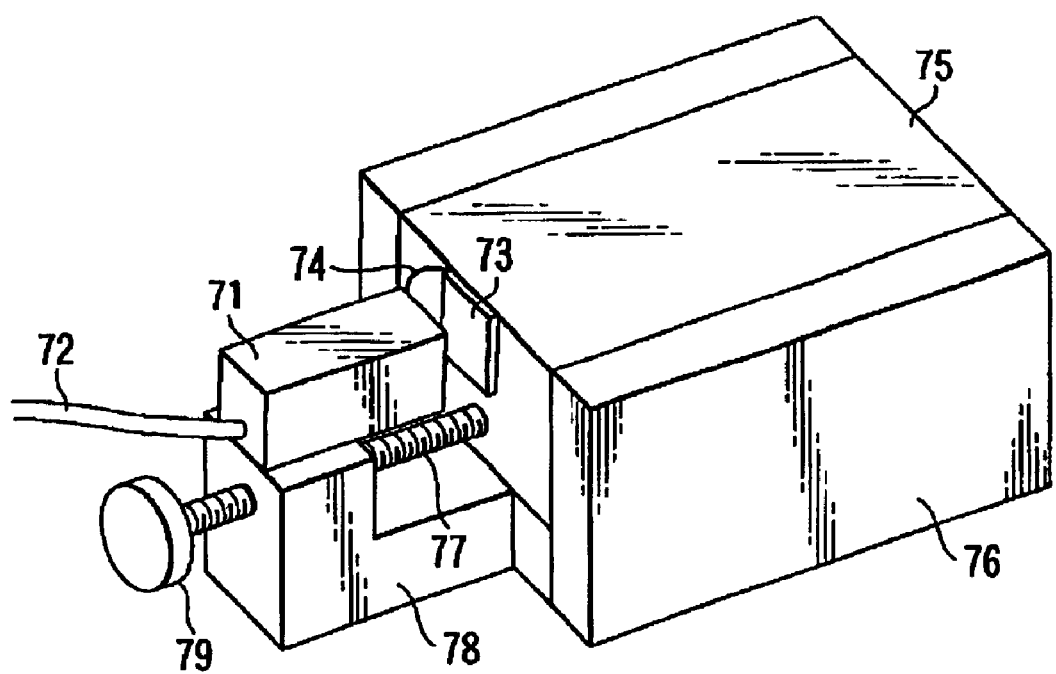
FIG. 8 is a perspective view showing an example of how the capacitance position sensor of the present invention is used.

FIG. 8 shows an example of application of the invention sensor for uniaxial position measurement. Reference numeral 71 in the drawing designates an invention sensor; 72 a lead line of the sensor 71; 75 a movable stage (for placement of the measured object); 73 an electrode mounted on the movable stage 75; 74 a ground line for grounding the electrode 73; 76 a mount for retaining the movable stage 75; 77 a feed screw; 78 a threaded mount for supporting the feed screw 77; and 79 a knob for turning the feed screw 77. The sensor 71 is installed on the upper surface of the threaded mount 78 and the sensor electrode (hidden from view in FIG. 8) faces the electrode 73.

The operator uses the knob 79 to turn the feed screw 77 so as to move the movable stage 75 left or right. The distance (capacitance) between the electrode of the sensor 71 and the electrode 73 is measured in terms of the frequency output by the sensor. This in turn makes it possible to determine (measure) the position of the measured object placed on the movable stage 75.

Figure 9:
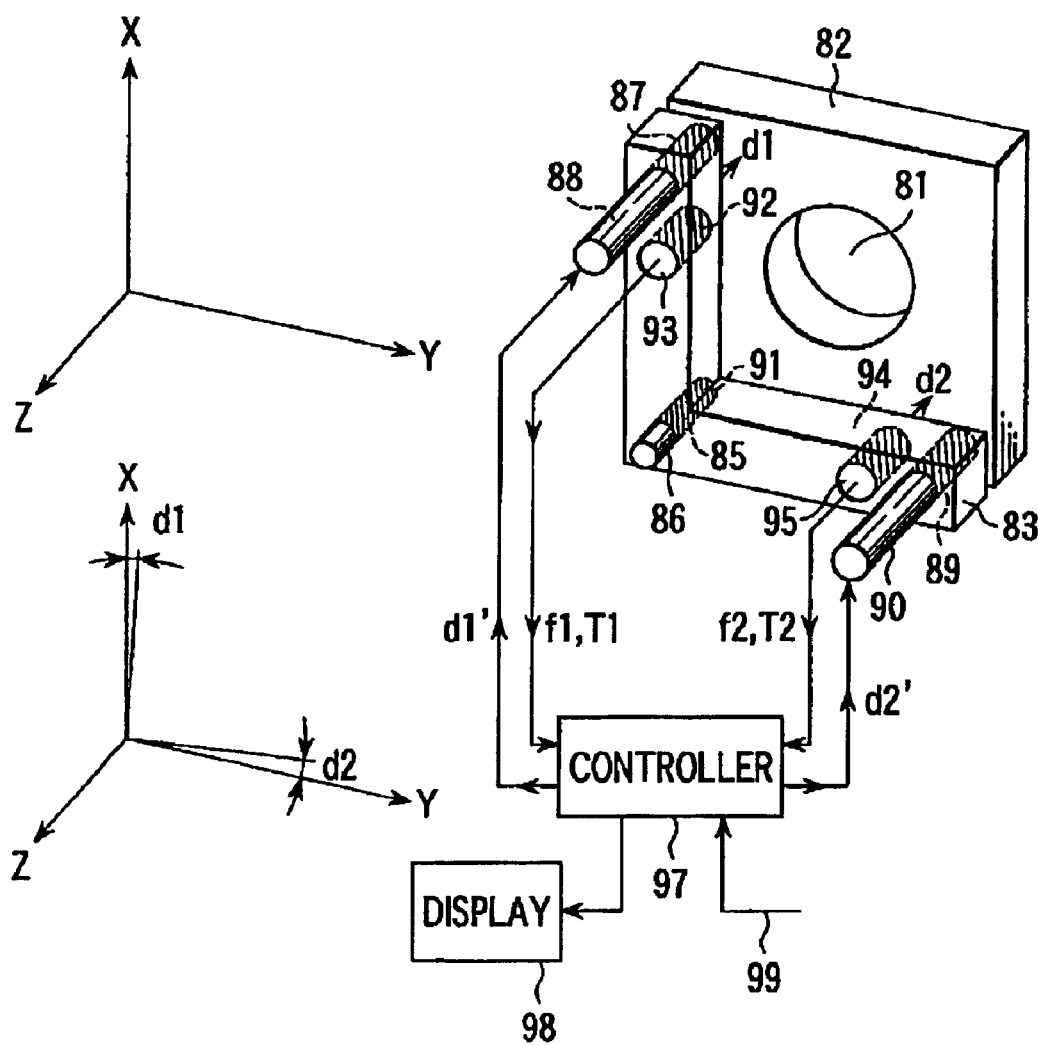
FIG. 9 is a perspective view showing an example of a biaxial position controller equipped with capacitance position sensors of the present invention.

FIG. 9 shows a biaxial position controller equipped with capacitance position sensors of the present invention that is used to biaxially control the position of a mirror used in a laser cavity. The biaxial position controller of the embodiment shown in FIG. 9 is a device for biaxially controlling the mirror face angle of a mirror holder of a laser cavity. A movable stage, operating section and detector section are shown in perspective view in the drawing. Reference numeral 82 in the drawing designates a mirror holder: 81 a mirror insertion hole for installing a mirror in the holder 82; 83 a stationary member for supporting the mirror holder 82; 85, 87 and 89 feed screws for adjusting the position of the mirror holder 82; and 86, 88 and 90 operation elements for turning the feed screws.

Springs (not shown) installed between the stationary member 83 and the mirror holder 82 in the vicinity of the feed screws 85, 87, 89 pull the mirror holder toward the stationary member. The feed screws 85, 87, 89 are inserted into and retained by the stationary member 83 with their tips (which can be made spherical) projecting from the stationary member 83 and each making pressure contact with the surface of the mirror holder at a single point. The tip 91 of the feed screw 85 determines the pivot point of the mirror holder and the feed screws 87, 89 operate against the force of the springs to adjust distances d1 and d2 between the mirror holder 82 and the stationary member 83.

Reference numerals 92, 94 designate electrodes attached to the mirror holder (the ground lines of these electrodes are not shown in the drawing); 93, 95 sensors with attached electrodes; 97 a controller; 98 a display; 99 a mirror adjustment signal command (e.g., the control signal of Japanese Unexamined Patent Publication No. 2001-196669). Electrodes are attached to the faces of the sensors 93, 95 that oppose the electrodes 92, 94. The sensors 93, 95 are fixed in holes formed in the stationary member at locations where measurement is to be performed.

The feed screws 87, 89 (which are similar to the feed screw 77 of of FIG. 8) are fitted in the stationary member 83 at locations near the top and on the right side of the mirror holder 82 as viewed in FIG. 9. The tips of these screws make pressure contact with the rear side of the mirror holder 82 at locations not visible in the drawing. Biaxial control of the mirror holder 82 (of d1 and d2 can therefore be performed by turning the feed screws using the operation elements 88, 90. The operation element 86 is for manually adjusting the origin of the biaxial control of the mirror holder 82.

Specifically, with the tip 91 of the feed screw 85 as a pivot point, the mirror holder 82 can be moved in the z direction in a plane parallel to the x axis in FIG. 9 by turning the feed screw 87 and be moved in the z direction in a plane parallel to the y axis in FIG. 9 by turning the feed screw 89. The inclination of the face of the mirror fitted in the mirror holder 82 is adjusted biaxially (d1, d2) with respect to an x-y system whose pivot point is the tip 91. The feeding of the operation elements 88, 90 can be controlled manually or, as shown in FIG. 9, by using motors operated by the controller 97 to drive the operation elements based on the mirror adjustment signal command 99. The operation elements 88, 90 can optionally be equipped with a mechanism for rough manual adjustment.

The biaxial data of the mirror holder 82 obtained by converting the oscillating frequency outputs f1, f2 of the sensors 93, 95 and temperature outputs T1, T2 of the temperature sensors from analog to digital are input to the controller 97, which uses them to calculate the temperature-adjusted inter-electrode distances, compares the results with the mirror adjustment signal command 99 (biaxial signal command), and outputs adjustment signals d1', d2' to the operation elements 88, 90, thereby controlling the driving of the operation elements.

While FIG. 8 relates to application of the invention sensor for uniaxial position measurement, application to a position controller for a uniaxial movable stage is also obviously possible. In this case, the knob 79 is operated to move the movable stage to a prescribed position based on the difference signal between a detected position signal from the sensor 71 and a control signal for the prescribed position.

Figure 10:
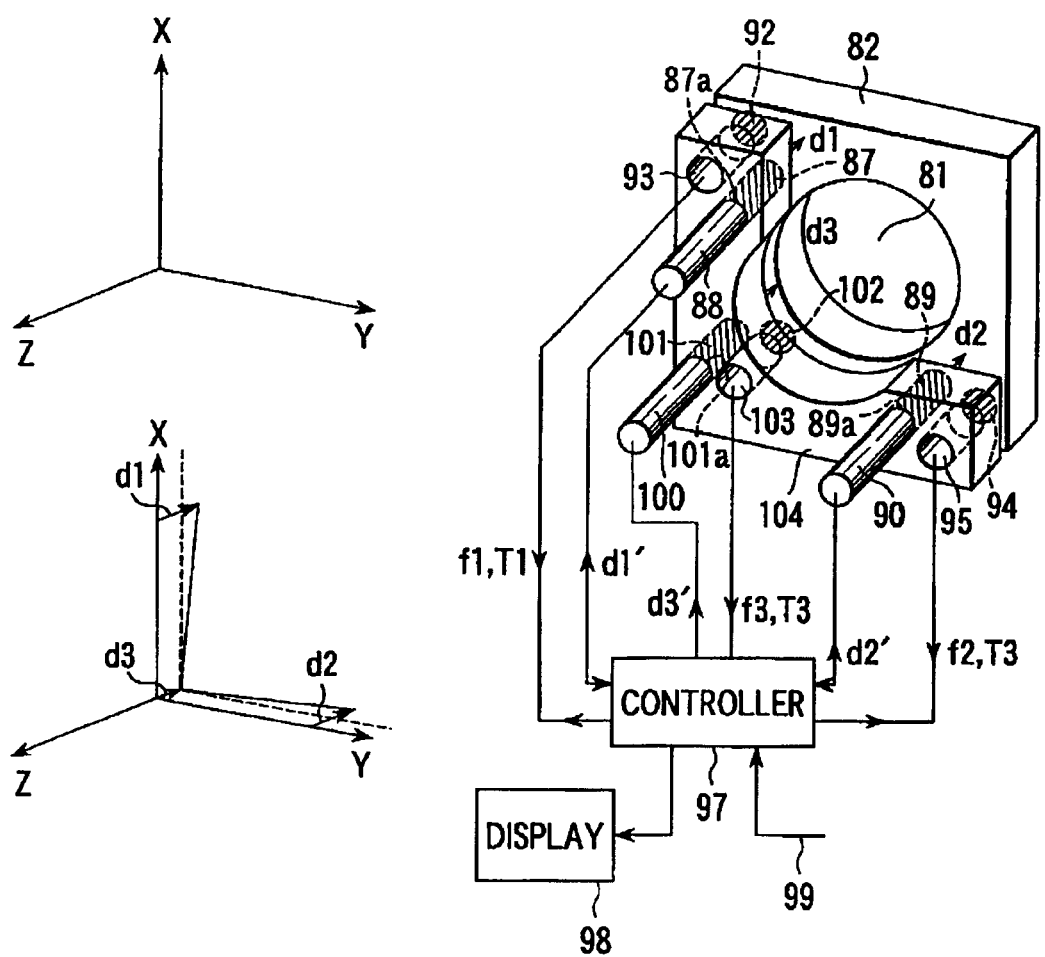
FIG. 10 is a perspective view showing an example of a triaxial position controller equipped with capacitance position sensors of the present invention.

FIG. 10 shows an example of using a triaxial position controller for mirror control. This triaxial position controller differs from the biaxial mirror controller of FIG. 9 in that the operation element 86 (for adjusting the origin) of FIG. 9 is replaced with an operation element 100 fastened to a stationary member 104, a feed screw 101, a sensor 103, and an electrode 102 attached to the mirror holder 82 so as to face the electrode of the sensor 103. The functions of the operation element 100, feed screw 101, sensor 103 and electrode 102 are respectively the same as those of the operation elements 88, 90, the feed screws 87, 89, the sensors 93, 95 and the electrodes 92, 94 and will not be explained again here. Reference symbols 87a, 89a and 101a designate feed screw portions inserted into the stationary member 104.

The operation element 100 is for moving the origin of the x, y and z axes in the drawing by distance d3 in the direction of the z axis (for origin adjustment). This enables the position controller of FIG. 10 to perform triaxial control (d1, d2 and d3). (In this specification and the attached drawings, members assigned like reference symbols are functionally identical.)

Figure 11:
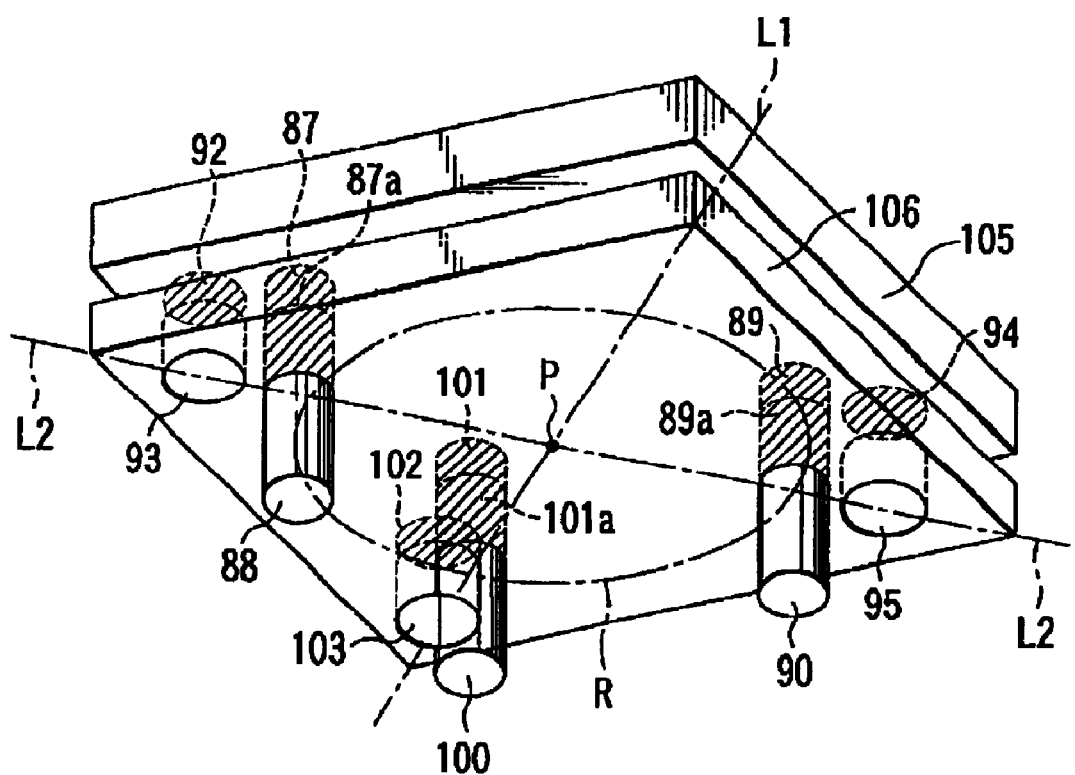
FIG. 11 is a perspective view showing a capacitance position sensor according to the present invention configured by installing a capacitance position sensor and operation means on a triaxially position-controlled tilt stage.

FIG. 11 is a perspective view showing a triaxial position controller like that in FIG. 10 in which the movable stage, operating section and detector section are modified. It concerns the layout of the operation elements and sensors on the movable stage. Reference numeral 105 in the drawing designates a movable stage, 106 a stationary member 106 and point P the center of the movable stage. The controlled object is placed on the movable stage with its center at P. Operation elements 88, 90 and 100 (extremities of feed screws 87, 89 and 101) are disposed on mutually perpendicular lines L1, L2 passing through point P at equal distances from the point P (on the circle R in the drawing). Sensors 93, 95 and 103 are similarly disposed at locations outside the circle R. This arrangements enables the operation elements to be independently driven, thereby reducing the difference between the actual movement distance and the movement distance detected by the sensors and simplifying error correction.

Figure 12:
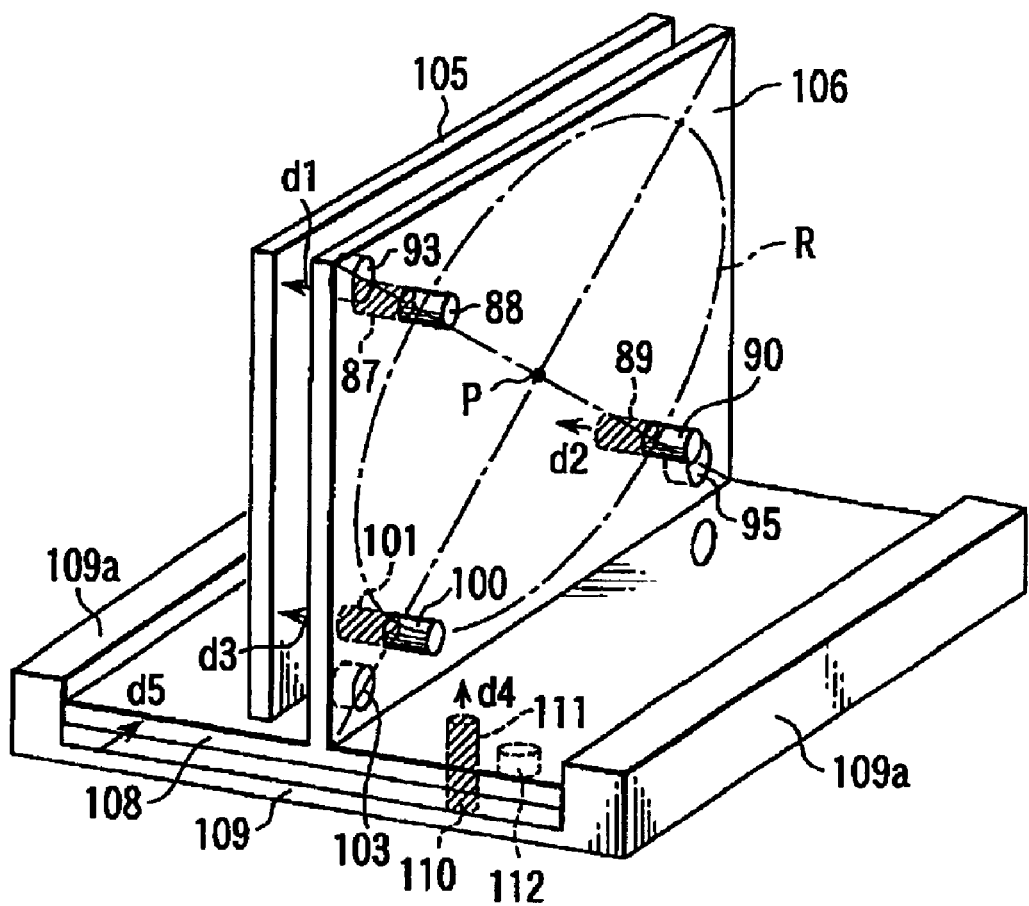
FIG. 12 is a perspective view showing another example of a quadaxial position controller equipped with capacitance position sensors of the present invention.

FIG. 12 is a perspective view showing an example of the movable stage, operating section and detector section of a quadraxial position controller. This position controller is what is obtained by combining a triaxial movable stage (FIG. 9) and a uniaxial movable stage to configure a quadraxial position controller. Reference numeral 108 in the drawing designates a movable stage; 109 a mount for the movable stage 108; 109a a guide for the movable stage 108; 110 an operating element for driving the feed screw 111; 111 a feed screw for adjusting the position of the movable stage 108; and 112 a sensor. The stationary member 106 is mounted at right angles to the surface of the movable stage 108. The movable stage 105 and associated stationary member 106, the operation elements 88, 90, 100, and the sensors 93, 95, 103 are the same as those of the triaxial position controller of FIG. 10. The operation element 110, feed screw 111 and sensor 112 are the same as those in FIGS. 9 and 10.

The movable stages 105, 108 are driven by turning the associated feed screws using the operation elements. The operation element 110 moves the movable stage 108 by distance d4 in the upward direction as viewed in the drawing (parallel to the surface of the stationary member 106). The detected distance signals from the four sensors 93, 95, 103, 112 and the control command signal are sent to a control circuit (not shown) that uses them to drive the four operation elements 88, 90, 100, 110, thereby performing quadraxial (d1, d2, d3, d4) control of the movable stages.

The number of position control axes can be increased by incorporating additional position control for the mount 109 (movable stage 108) of FIG. 12. For instance, position control in five axial directions can be achieved by incorporating position control for moving the mount 109 (movable stage 108) in FIG. 12. Where, d5 corresponds to the moving distance of the movable stage 108. Further, position control in six axial directions can be achieved by incorporating control for rotating the mount 109 (movable stage 108). Thus various types of multiaxial control can be realized as desired.

The position controller of the present invention was explained with regard to multiaxial position control of a movable stage (mirror holder). However, the invention is not limited to this application but can also be applied for multiaxial position control of multiple points on a curved surface or the surface of a solid object.

As pointed out earlier, no capacitance position sensor similar to that of the present invention has been available up to now. The capacitance position sensor of the present invention is noise resistant and enables contactless, high-accuracy detection of position by discriminating capacitance (distance) from the frequency of an oscillator circuit. In addition, the position sensor according to the present invention offers high accuracy performance notwithstanding its simple configuration and the fact that it is less than one-quarter as large and less than one-half as expensive as the conventional position sensor. Further, the low cost and simple structure of the position sensor make it simple and feasible to install numerous sensors on constituent members of the measured object.

The position controller equipped with the position sensor(s) of the present invention enables the driven member and associated stationary member to be combined, makes it possible to install the electrode(s) required for position control at the required location(s) of the controlled object and allows a sensor or sensors to be installed on the mount as desired. Desired multiaxial positional control of the controlled object can therefore be realized. The fact that numerous sensors can be installed on the stationary member of the controlled object is highly convenient in situations that require multiaxial control.

What is claimed is:

1. A capacitance position sensor comprising:
   a pair of opposed tabular electrodes;
   an LC oscillator circuit having a toroidal core winding and whose oscillating frequency varies with change in capacitance between the pair of electrodes;
   an electrical shield disposed between one of the pair of opposed tabular electrodes connected to the LC oscillator circuit and the LC oscillator circuit; and
   an arithmetic processing unit configured to calculate an absolute value of a distance between the electrodes from the oscillating frequency of the oscillator circuit.

2. A position sensor according to claim 1, wherein:
   the toroidal core comprises carbonyl iron dust.

3. A capacitance position sensor according to claim 1, wherein:
   the oscillator circuit comprises a Clapp oscillator circuit.

4. A position sensor according to any of claims 1 to 3, wherein:
   the oscillator circuit including the toroidal core is encapsulated in a molding together with a temperature sensor and the arithmetic processing unit is configured to use an output of the temperature sensor to calculate a temperature corrected value of the frequency of the oscillator circuit output.

5. A position sensor according to claim 4, wherein:
   the molding-encapsulated oscillator circuit is shielded by covering the molding-encapsulated oscillator circuit with a thin metal sheet as said electrical shield.

6. A position sensor according to claim 5, wherein:
   one of the pair of opposed electrodes is formed on a surface of a base plate provided with a printed circuit board projecting from its rear surface;
   the oscillator circuit is formed on the printed circuit board: and
   a shielding metal film is provided on the rear side surface of the circuit board as said electrical shield.

7. A position controller comprising:
   a stationary member formed with one electrode of the pair of electrodes of a position sensor according to claim 5;
   a movable member on which the other electrode of the pair of electrodes is formed; and
   a moving member configured to move the movable member relative to the stationary member.

8. A position sensor according to claim 4, wherein:
   one of the pair of opposed electrodes is formed on a surface of a base plate provided with a printed circuit board projecting from its rear surface;
   the oscillator circuit is formed on the printed circuit board: and
   a shielding metal film is provided on the rear side surface of the circuit board as said electrical shield.

9. A position controller comprising:
   a stationary member formed with one electrode of the pair of electrodes of a position sensor according to claim 4;
   a movable member on which the other electrode of the pair of electrodes is formed; and
   a moving member configured to move the movable member relative to the stationary member.

10. A position sensor according to any of claims 1 to 3, wherein:
    one of the pair of opposed electrodes is formed on a surface of a base plate provided with a printed circuit board projecting from its rear surface;
    the oscillator circuit is formed on the printed circuit board: and
    a shielding metal film is provided on the rear side surface of the circuit board as said electrical shield.

11. A position controller comprising:
    a stationary member formed with one electrode of the pair of electrodes of a position sensor according to claim 10,
    a movable member on which the other electrode of the pair of electrodes is formed; and
    a moving member configured to move the movable member relative to the stationary member.

12. A capacitance position sensor according to claim 2, wherein:
    the oscillator circuit comprises a Clapp oscillator circuit.

13. A position sensor according to claim 12, wherein:
    the oscillator circuit including the toroidal core is encapsulated in a molding together with a temperature sensor and the arithmetic processing unit is configured to use an output of the temperature sensor to calculate a temperature corrected value of the frequency of the oscillator circuit output.

14. A position sensor according to claim 12, wherein:
the molding-encapsulated oscillator circuit is shielded by covering the molding-encapsulated oscillator circuit with a thin metal sheet as said electrical shield.

15. A position sensor according to claim 12, wherein:
one of the pair of opposed electrodes is formed on a surface of a base plate provided with a printed circuit board projecting from its rear surface;
the oscillator circuit is formed on the printed circuit board: and
a shielding metal film is provided on the rear side surface of the circuit board as said electrical shield.

16. A position controller comprising:
a stationary member formed with one electrode of the pair of electrodes of a position sensor according to claim 12,
a movable member on which the other electrode of the pair of electrodes is formed; and a moving member configured to move the movable member relative to the stationary member.

17. A position controller comprising:

a stationary member formed with one electrode of the pair of electrodes of a position sensor according to any of claims 1 to 3;

a movable member on which the other electrode of the pair of electrodes is formed; and a moving member configured to move the movable member relative to the stationary member.

* * * * *